United States Patent [19]

Schachter

[11] 4,046,936

[45] Sept. 6, 1977

[54] IMPRINTED COMPRESSIBLE FOAM ARTICLE AND METHOD OF MANUFACTURE

[76] Inventor: Joseph D. Schachter, 866 Elm Street, Winnipeg, Manitoba, Canada

[21] Appl. No.: 757,663

[22] Filed: Jan. 7, 1977

[30] Foreign Application Priority Data

Dec. 29, 1976 Canada .................................. 268,782

[51] Int. Cl.$^2$ ........................... B32B 3/00; B32B 7/14

[52] U.S. Cl. .................................... 428/195; 427/256; 427/372 R; 428/207; 428/311; 428/315; 428/914; 101/468

[58] Field of Search ........................... 427/256, 372 R; 428/195, 206, 207, 310, 311, 315, 914; 101/468

[56] References Cited

U.S. PATENT DOCUMENTS

| | | | |
|---|---|---|---|
| 3,070,476 | 12/1962 | Miller | 428/195 |
| 3,458,340 | 7/1969 | Karsten | 428/195 |
| 3,591,402 | 7/1971 | Blackfin | 428/195 |
| 3,860,388 | 1/1975 | Haigh | 428/462 |
| 3,922,445 | 11/1975 | Mizuno et al. | 428/914 |
| 3,928,710 | 12/1975 | Arnold et al. | 428/195 |

*Primary Examiner*—William J. Van Balen

[57] ABSTRACT

A multicellular compressible article comprising a volume of compressible foam cut to predetermined dimensions, and a design imprint on the surface of the foam deposited by direct heat transfer sublimation of sublistatic ink.

11 Claims, No Drawings

IMPRINTED COMPRESSIBLE FOAM ARTICLE AND METHOD OF MANUFACTURE

This invention relates to a compressible foam article to which a colored design has been applied with substantially improved registration, and to a method of applying the design.

Polyurethane foam and foam rubber material are popular resilient fillers for cushions, mattresses, and other articles of furniture where softness is to be obtained. Generally, the shape of the filler is cut, and it is covered by material which imparts a different surface texture to the foam material, and also provides an appearance design.

There are many articles requiring the softness of the foam material, but which do not need the surface texture imparted by a covering of cloth, vinyl or the like. Consequently the major objection to use of the bare foam material is that substantial difficulties have been encountered in imprinting a professional quality design in colors on its surface.

It has been found that many paints which could be used in a silk screening process of imparting the design are relatively hard and brittle, and flexing of the foam material eventually results in flaking of the paint and rapid deterioration of the design. Other kinds of inks more suitable for foam materials required stamping. Since stamping ultimately results in compression of the foam material during its application, substantial difficulties have been encountered in obtaining good registration of various colors in the design. Moreover, in the stamping process, only a single color could be deposited at a time, and considerably labour and other handling is required even to obtain the less than perfect multicolored resulting design.

Sublimating inks have been proposed to be used on plastics, transferred from transfer paper, as described in U.S. Pat. No. 3,860,388, issued Jan. 14, 1975 to John M. Haigh. However, it had been found that polyethylene film was required between the transfer paper and the plastic to be imprinted, the dye being defused through the polyethylene film before being absorbed into the surface of the plastic. The polyethylene film is laminated to the surface of the plastic, and protects the now colored surface of the plastic. It should be noted that heat and pressure are both required in the transfer of the design, as well as a membrane for protecting the surface of the plastic to be imprinted from the transfer paper, through which the dyes defuse. Furthermore, a final clear polyethylene film coating is further required to protect the design.

I have discovered that porous foam materials, such as both open and closed cell polyurethane foam and foam rubber can be printed in a substantially simpler manner. In using my process, all the colors required in the design are printed at the same time, while retaining excellent registration. While heat is used in the transfer of the dyes to the surface of the foam material, pressure is not used, and consequently there is substantially no misalignment of the various colored areas with respect to each other during the transfer process. Furthermore, I have found that this process does not require an intervening protective membrane through which the inks defuse, and the transfer paper which I use can be in direct contact with the foam material. In open cell foams, the ink penetrates substantially into the material, typically ⅛ inch deep, providing for solid colors and good retention of the design after substantial wear and abrasion.

As a result of this new printing process, materials such as polyurethane foam and foam rubber can be used with an imprinted design, and without any further surface covering as such articles as stadium seat cushions, certain kinds of furniture, wall hanging ornaments, paper weight coverings or other novelties, soft toys, etc.

In general, the inventive method of making an imprinted multicellular compressible article is comprised of the steps of applying a transfer paper carrying an inverse printed design in sublistatic ink on one surface of compressible cellular foam material with said one surface side down, and applying heat to the other surface of the transfer paper to cause transfer of the ink in the design to the surface of the foam directly under the transfer paper, without applying compression force on the foam.

This results in a new multicellular compressible article comprising a volume of compressible foam cut to predetermined demensions, having a design imprint on the surface of the foam deposited by direct heat transfer sublimation of sublistatic ink.

Assuming that, for example, a stadium seat cushion is to be manufactured, a large block of foam material such as open cell polyurethane foam grade 1338NW2 available from Monsanto Corp., 1 and ½ inches thick, is provided. A multi colored design, such as a large flower the size of the eventual stadium seat cushion, a similarly sized trade mark logo, or an advertising desing, etc. is imprinted in sublistatic ink in inverse on transfer paper, as by silk screening. A multiplicity of such designs can be printed on a large sheet of heat transfer paper, or individual sheets of paper can each carry the inverse of the design to be printed.

The transfer paper is then placed with the surface carrying the design in ink in contact with the broad plane surface of the foam material, and heat is applied as from a large heated metal plate with minimal pressure. Typically the transfer paper is heated for 30 seconds at 410° Fahrenheit. The colors are transferred simultaneously from the transfer paper to the surface of the foam material and penetrate into the cellular cavities of the foam material, coating all surfaces to a depth of, for instance, ⅛ inch. The depth can be controlled by the time of application of heat, as well as, somewhat, the temperature used.

Where individual sheets of transfer paper are used, each will be applied separately to various locations on one or both plane surfaces of the block of foam material. Where a large sheet of transfer paper carries a multiplicity of designs, each can be applied sequentially by the application of the heated plate to the unprinted side of the transfer paper in succession, or all or a number are transferred simultaneously using a sufficiently large heated plate.

It is important that sublistatic inks be used in this process. Sublistatic inks are available under the trade mark MARLER TEX, from hunter-Penrose Limited, Bridge Road, Kingswood, Bristol, England.

This ink has been found to be colorfast and will not run when wet and will consequently not transfer to a person's clothing if the article is sat upon when wet.

No interleaving layer has been found to be required, no crusting of the ink has been observed, nor subsequent flaking or chipping, and all colors maintain their relative registration originally established on the transfer paper by silk screening due to the fact that no compression of the foam is required during the process.

The foam material as a last step can be cut into the shape of a cushion, novelty, or the like and directly used. As noted above, imprinted designs can also be placed on the reverse side, and the edge can also be similarly colored if desired.

Accordingly, I have provided for the first time a method for producing articles of polyurethane or rubber foam which can be successfully printed and thus expose its surface visually to the user. The article can be flexed and compressed and the colors will not crust or chip. Furthermore all the colors of the design are imprinted simultaneously, maintaining registration between the various colored areas of the design, resulting in a pleasing and professional quality appearance.

Variations in the method or of the inventive articles may now become evident to a person skilled in the art after reading this specification. All are considered to be part of this invention as defined by the appended claims.

The embodiments of the invention in which an exclusive property or privilege is claimed are defined as follows:

1. A multicellular compressible article comprising (a) a volume of compressible foam cut ot predetermined dimensions, (b) a design imprint on the surface of the foam desposited by direct heat transfer sublimation of sublistatic ink.

2. An article as defined in claim 1 in which the compressible foam is selected from the group of materials of closed or open cell polyurethane foam and foam rubber.

3. An article as defined in claim 1 in which the compressible foam is open cell polyurethane foam having a plane surface for receiving the deposit of said sublistatic ink.

4. An article as defined in claim 1, in which the imprint has been deposited by simultaneous direct heat transfer of a design imprint of more than one color of sublistatic ink previously printed in inverse on transfer paper.

5. An article as defined in claim 1, in which the imprint has been deposited by simultaneous direct heat transfer of a design imprint of more than one color of sublistatic ink previously printed in inverse on transfer paper, in the form of a seat cushion.

6. An article as defined in claim 1, in which the imprint has been deposited by simultaneous direct heat transfer of a design imprint of more than one color of sublistatic ink previously printed in inverse on transfer paper, in the form of at least a portion of an article of furniture.

7. An article as defined in claim 1, in which the imprint has been deposited by simultaneous direct heat transfer of a design imprint of more than one color of sublistatic ink previously printed in inverse on transfer paper, in the form of a toy.

8. A method of making an imprinted multicellular article comprising the steps of a. applying a transfer paper, carrying an inverse printed design in sublistatic ink on one surface, said one surface side down on the surface of compressible cellular foam material, b, applying heat to the other surface of the transfer paper to cause transfer of the ink in the design to the surface of the foam directly under the transfer paper, without applying compression force on the foam.

9. A method of making an article as defined in claim 8, including the step prior to step (a) of preparing the transfer paper by silk screening an inverse multicolor design in sublistatic ink on said one surface and allowing the ink to dry.

10. A method of making an article as defined in claim 9 including the further step of cutting the foam material along the outline of the design.

11. n article as defined in claim 3, in which the imprint has been deposited by simultaneous direct heat transfer of a design imprint of more than one color of sublistatic ink previously printed in inverse on transfer paper.

* * * * *